(12) United States Patent
Abdelhakim et al.

(10) Patent No.: US 12,005,795 B2
(45) Date of Patent: Jun. 11, 2024

(54) ONBOARD POWERTRAIN FOR AN AUTOMATED GUIDED VEHICLE

(71) Applicant: ABB Schweiz AG, Baden (CH)

(72) Inventors: Ahmed Abdelhakim, Västerås (SE); Haofeng Bai, Västerås (SE); Frans Dijkhuizen, Skultuna (SE)

(73) Assignee: ABB Schweiz AG, Baden (CH)

( * ) Notice: Subject to any disclaimer, the term of this patent is extended or adjusted under 35 U.S.C. 154(b) by 118 days.

(21) Appl. No.: 17/755,363

(22) PCT Filed: Nov. 27, 2019

(86) PCT No.: PCT/EP2019/082759
§ 371 (c)(1),
(2) Date: Apr. 27, 2022

(87) PCT Pub. No.: WO2021/104621
PCT Pub. Date: Jun. 3, 2021

(65) Prior Publication Data
US 2022/0379753 A1 Dec. 1, 2022

(51) Int. Cl.
*B60L 53/22* (2019.01)
*H02P 27/06* (2006.01)

(52) U.S. Cl.
CPC .............. *B60L 53/22* (2019.02); *H02P 27/06* (2013.01)

(58) Field of Classification Search
CPC ................................. B60L 53/22; H02P 27/06
See application file for complete search history.

(56) References Cited

U.S. PATENT DOCUMENTS 10,381,951 B1 * 8/2019 Moradisizkoohi .... H02M 7/537
2014/0117770 A1 5/2014 Emadi et al.

FOREIGN PATENT DOCUMENTS

| DE | 102017221365 A1 | 5/2019 |
| DE | 102018009848 A1 | 6/2019 |
| EP | 3293036 A1 | 3/2018 |
| WO | 2011078577 A2 | 6/2011 |

OTHER PUBLICATIONS

Abdelhakim, Ahmed, et al.; "Three-phase Split-Source Inverter (SSI): Analysis and Modulation"; Nov. 2016 IEEE Transactions on Power Electronics, vol. 31, Issue 11; IEEE; Dec. 29, 2015; 12 Pages.
Al-Qrimli, Fadhil Abbas M., et al.; "Three-Phase Split-Source Inverter [SSI]"; International Journal of Computer Applications (0975-8887), vol. 168, No. 4; Jun. 1, 2017; 5 Pages.

(Continued)

*Primary Examiner* — Robert L Deberadinis
(74) *Attorney, Agent, or Firm* — Whitmyer IP Group LLC

(57) ABSTRACT

An onboard powertrain for an automated guided vehicle, AGV, is presented herein. The onboard powertrain includes a split-source inverter, SSI, having at least one middle point pole, a positive DC-link pole, and a negative DC-link pole, a battery and an inductor connected in series between the positive or negative DC-link pole and the middle point pole, and a supercapacitor connected between the positive and negative DC-link poles.

20 Claims, 3 Drawing Sheets

(56) References Cited

OTHER PUBLICATIONS

Abdelhakim, Ahmed, et al.; "Performance Evaluation of the Single-Phase Split-Source Inverter Using an Alternative DC-AC Configuration"; Jan. 2018 IEEE Transactions on Industrial Electronics, vol. 65, No. 1; IEEE; Jun. 9, 2017; 11 Pages.

Dorn-Gomba, Lea, et al.; "A Novel Hybrid Energy Storage System Using the Multi-Source Inverter"; 2018 IEEE Applied Power Electronics Conference and Exposition (APEC); San Antonio, TX, USA; IEEE; Mar. 4, 2018; 8 Pages.

Hassan, M. S., et al.; "Common-Mode Voltage Investigation and Reduction of Split-Source Inverter"; 6th IEEE International Conference on Smart Grid (icSmartGrid) 2018; Nagasaki, Japan; IEEE; Dec. 4, 2018; 5 Pages.

Mahadik, Yogesh, et al.; "Battery Life Enhancement in a Hybrid Electrical Energy Storage System Using a Multi-Source Inverter"; World Electric Vehicle Journal, vol. 10, (17), Issue 2; MDPI; Apr. 12, 2019; 26 Pages.

International Search Report and Written Opinion of the International Searching Authority; Application No. PCT/EP2019/082759; Completed: Apr. 23, 2020; dated May 6, 2020; 16 Pages.

International Search Report and Written Opinion of the International Searching Authority; Application No. PCT/EP2019/082759; dated May 17, 2022; 8 Pages.

\* cited by examiner

ONBOARD POWERTRAIN FOR AN AUTOMATED GUIDED VEHICLE

TECHNICAL FIELD

The present disclosure relates to an onboard power train for an automated guided vehicle.

BACKGROUND

Automated guided vehicles (AGVs) use batteries to provide power to different motors in the AGVs. An example of a powertrain for an AGV is illustrated in FIG. 1A. A battery 1, with a voltage $V_B$, is connected to a DC-link (illustrated as a voltage source inverter VSI) through a DC/DC converter (illustrated as a boost converter BC). The battery 1 may alternatively be connected directly to the VSI. In electrical vehicle (EV) applications, supercapacitors have been used to extend the battery lifetime, and thus the lifetime of the entire system. In FIG. 1A a supercapacitor 5 is provided in BC and/or a supercapacitor 6 in the VSI, for buffering high-power peaks from acceleration and regenerative breaking. The BC comprises an inductor 2 connected to the battery 1 and to MOSFET 4 connected to the VSI as well as to the supercapacitor 5. The inductor 2 is further connected to MOSFET 3. The VSI comprises MOSFETs 7-12 arranged to provide the motor voltages $V_a$-$V_c$. Thus, integrating a supercapacitor unit into the onboard energy storage unit has a high potential in reducing the overall cost of the system and extends its lifetime as well. In this case, the common practice is to have another DC/DC converter to interface the supercapacitor, i.e. two BCs will be utilized as follows: one BC for the battery and one BC for the supercapacitor, where the output of both DC/DC converters will be connected in parallel to the VSI as shown in FIG. 1B. In FIG. 1B a supercapacitor BC is added in parallel to the powertrain illustrated in FIG. 1A, for buffering high-power peaks from acceleration and regenerative breaking. The supercapacitor BC comprises an inductor 14 connected to a battery 13 and to MOSFET 16 connected to the VSI as well as to supercapacitor 17. The inductor 14 is further connected to MOSFET 15.

In AGV applications, cost and compactness of the onboard powertrain are highly evaluated. For the conventional solution shown in FIG. 1B, there are two DC/DC converters, BC, and one VSI, which lead to high cost and limitation toward more compact system design.

As stated in https://en.wikipedia.org/wiki/Supercapacitor, a supercapacitor (SC), also called an ultracapacitor, is a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, can accept and deliver charge much faster than batteries with much higher current capabilities, and tolerates many more charge and discharge cycles than rechargeable batteries.

Unlike ordinary capacitors, supercapacitors do not use conventional solid dielectric, but rather, they use electrostatic double-layer capacitance and electrochemical pseudo-capacitance, both of which contribute to the total capacitance of the capacitor, with a few differences.

Electrostatic double-layer capacitors (EDLCs) use carbon electrodes or derivatives with much higher electrostatic double-layer capacitance than electrochemical pseudo-capacitance, achieving separation of charge in a Helmholtz double layer at the interface between the surface of a conductive electrode and an electrolyte. The separation of charge is of the order of a few Angstrom (0.3-0.8 nm), much smaller than in a conventional capacitor.

Electrochemical pseudo-capacitors use metal oxide or conducting polymer electrodes with a high amount of electrochemical pseudo-capacitance additional to the double-layer capacitance. Pseudo-capacitance is achieved by Faradaic electron charge-transfer with redox reactions, intercalation or electrosorption.

Hybrid capacitors, such as a lithium-ion capacitor, use electrodes with differing characteristics: one exhibiting mostly electrostatic capacitance and the other mostly electrochemical capacitance.

The electrolyte forms an ionic conductive connection between the two electrodes which distinguishes them from conventional electrolytic capacitors where a dielectric layer always exists, and the so-called electrolyte, e.g., MnO2 or conducting polymer, is in fact part of the second electrode (the cathode, or more correctly the positive electrode). Supercapacitors are polarized by design with asymmetric electrodes, or, for symmetric electrodes, by a potential applied during manufacture.

SUMMARY

One objective of the present invention is to integrate a battery and a supercapacitor in an onboard powertrain for an automated guided vehicle (AGV) without the need of the additional DC/DC converter to enable a compact system design. According to a first aspect there is provided an onboard powertrain for an AGV. The onboard powertrain comprises a split-source inverter (SSI) having at least one middle point pole, a positive DC-link pole, and a negative DC-link pole, a battery and an inductor connected in series between the positive or negative DC-link pole and the middle point pole, and a supercapacitor connected between the positive and negative DC-link poles. The onboard powertrain may be configured to generate a plurality of electrical phases, such as three electrical phases. Each electrical phase may be connected to an individual middle point pole. The onboard powertrain may further comprise a battery and an inductor connected in series between the positive or negative DC-link pole and each middle point pole. All electrical phases may be connected to a common middle point pole. The onboard powertrain may further comprise a semiconductor element between the common middle point pole and each electrical phase. The semiconductor element may be a diode or a MOSFET. The battery may be connected closer to the positive or negative DC-link pole than to the inductor. The onboard powertrain may further comprise a supercapacitor per electrical phase of the SSI, each connected between a common negative DC-link pole for the SSI and a separate positive DC-link pole per phase of the SSI. The onboard powertrain may further comprise an off-board charger with a step-down transformer. The onboard charger may be connected to the electrical phases of the SSI via switches and inductances. The onboard charger may be connected separately to individual middle point poles. The onboard charger may be connected to a common middle point pole. The capacitance of at least one supercapacitor may be at least 1 mJ/mm³. The capacitance of each supercapacitor may be at least 1 farad (F), such as at least 10 F or at least 100 F.

By the presented onboard powertrain, the supercapacitor is connected to the DC-link terminals, to allow peak load shaving and buffering for the battery. A modular design is also made possible by integrating the switch into the SSI. The motor may further be driven to varying the DC-link voltage. The DC-link will further have less voltage variations, since the battery is connected directly to the DC-link and the supercapacitor is arranged to inject high current only.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1A:
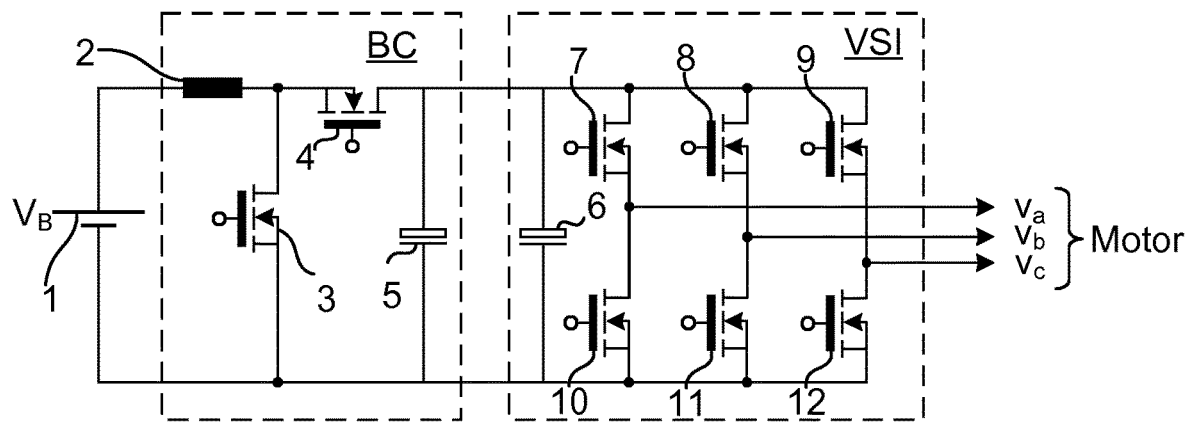
FIGS. 1A and 1B are diagrams schematically illustrating known onboard powertrains for an AGV.
Figure 1B:
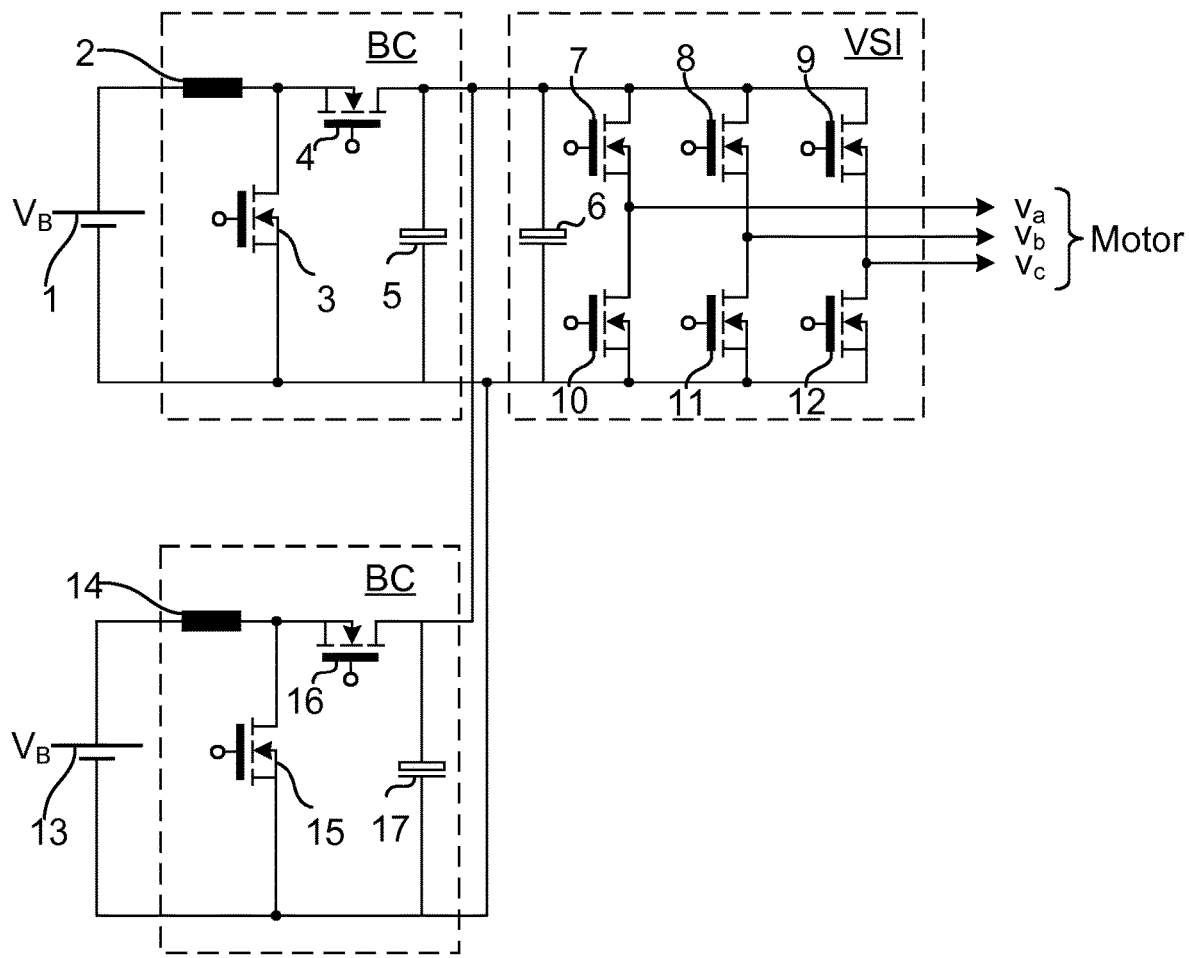
Figure 2A:
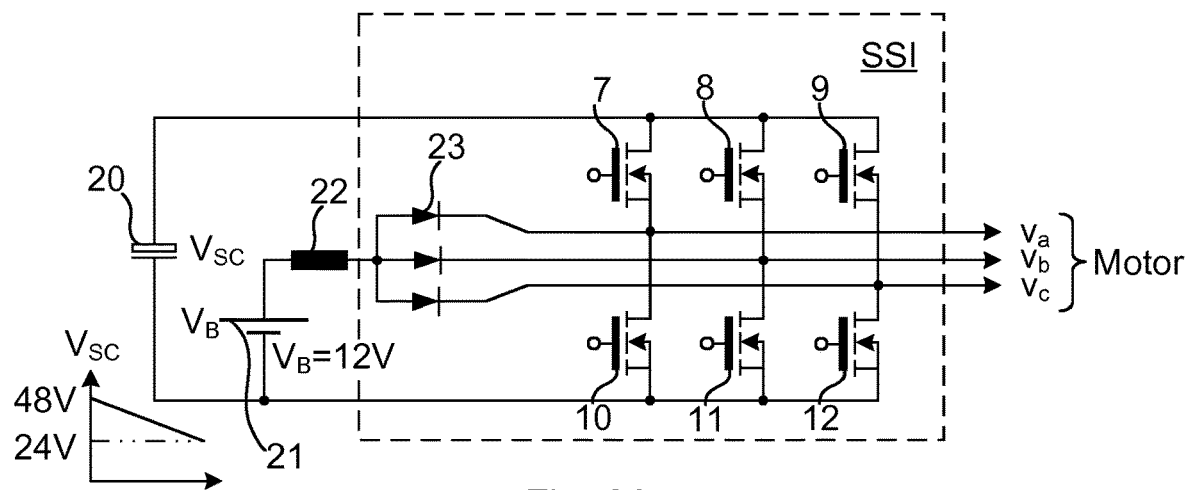
FIGS. 2A-2B, and 3-6 are diagrams schematically illustrating embodiments of onboard powertrains for an AGV.
Figure 2B:
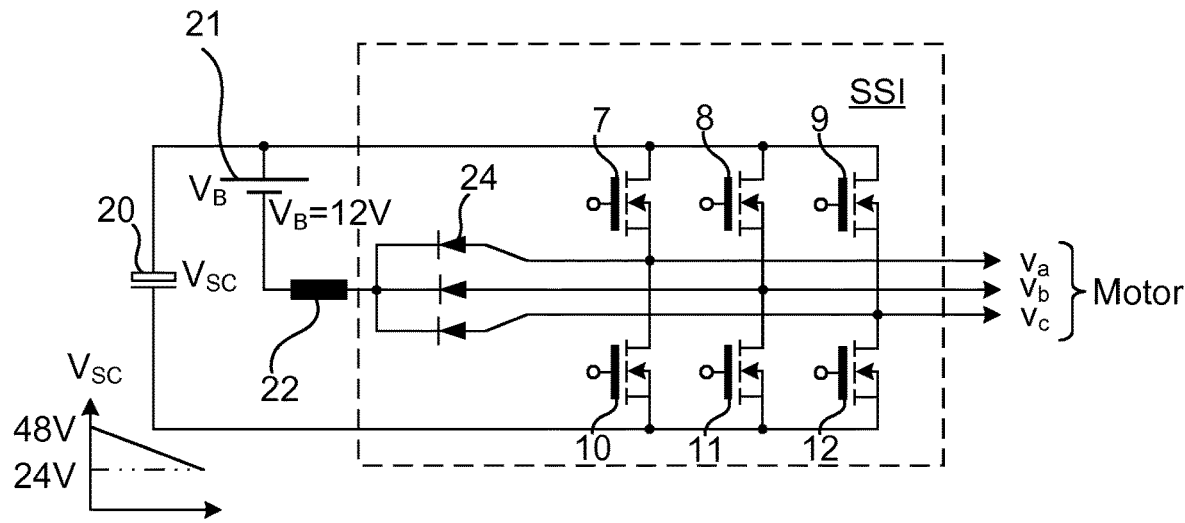

An embodiment of an onboard powertrain for an AGV is presented with reference to FIGS. 2A and 2B. The embodiment presents an efficient topology to integrate a battery and a supercapacitor with a diode-inductor set to provide a split-source inverter (SSI), utilizing a two-level converter available on the shelf.

A supercapacitor 20 is connected to a DC-link of the three-phase SSI, i.e. between a positive and negative pole of the DC-link. A battery 21, configured to drive a three-phase AGV, is connected between a middle point of the SSI via an inductor 22 and the negative (FIG. 2A) or positive (FIG. 2B) pole of the DC-link for the motor drive of the AGV.

The middle point of the SSI is connected to a diode 23 per phase of the three-phase SSI, each phase being connected to a respective AC terminal, $V_a$, $V_b$, $V_c$, of the motor. The SSI further comprises MOSFETs 7-12 arranged to provide the motor voltages $V_a$-$V_c$.

Both the battery current and the supercapacitor current can thus be controlled by the SSI so that only smooth DC-current is taken from/fed to the battery and fluctuating current is buffered by the supercapacitor, which has better cycling capability and less internal loss. The battery lifetime can be extended while the lifetime of the supercapacitor is significantly longer than the battery and is not a concern. Also, the energy from regenerative break can be buffered to extend the recharge mileage. The energy from regenerative break is buffered in the supercapacitor, which voltage will build up and which is designed to handle such case. The energy stored in the supercapacitor is then injected again to the load during acceleration.

With a battery voltage $V_B$ of 12 V and a supercapacitor rated voltage $V_{SC}$ of 48 V, the DC-link voltage of the system may vary between 48 V and 24 V in order to allow the high current injection or absorption from the motor.

Energy flow is thus allowed among the supercapacitor 20, the battery 21 and the motor. There are two main advantages: battery lifetime and recharge mileage can be extended by using the supercapacitor to buffer the load peaks and absorb the regenerated energy; and the cost of the diodes and the inductor is potentially lower than the cost of the DC/DC converter in the conventional solution.

The SSI, battery and supercapacitor can all each be made of standard commercial products. The inductor with diodes may alternatively be integrated as one piece instead of being a standard product connected to a standard SSI. The topology can be realized with minimum design modification of a typical onboard powertrain of an AGV.

Figure 3:
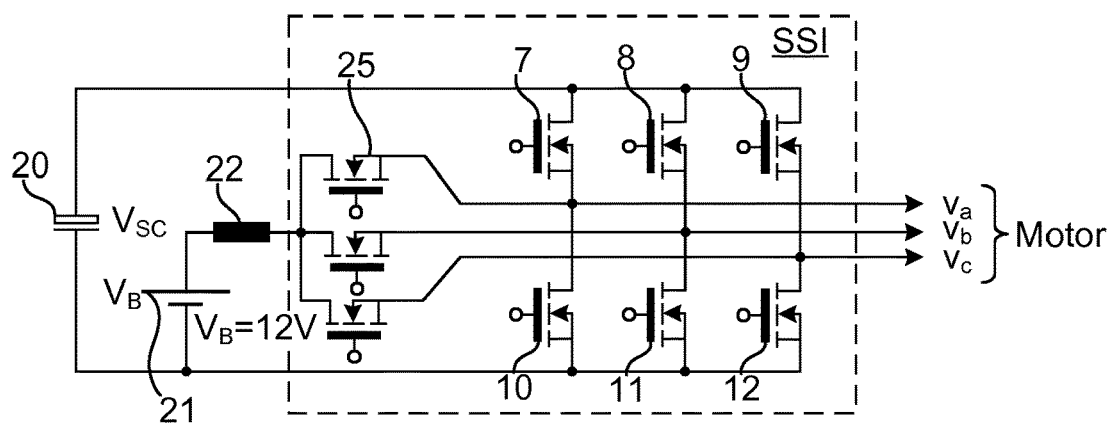

FIG. 3 illustrates an embodiment with a topology where the diodes 23 and 24 of FIGS. 2A and 2B are replaced by MOSFETs 25 to allow a bi-directional power flow. When pushing energy into the battery, the MOSFET 25 work in synchronized rectification mode and switches at the fundamental frequency according to the motor requirements.

Figure 4:
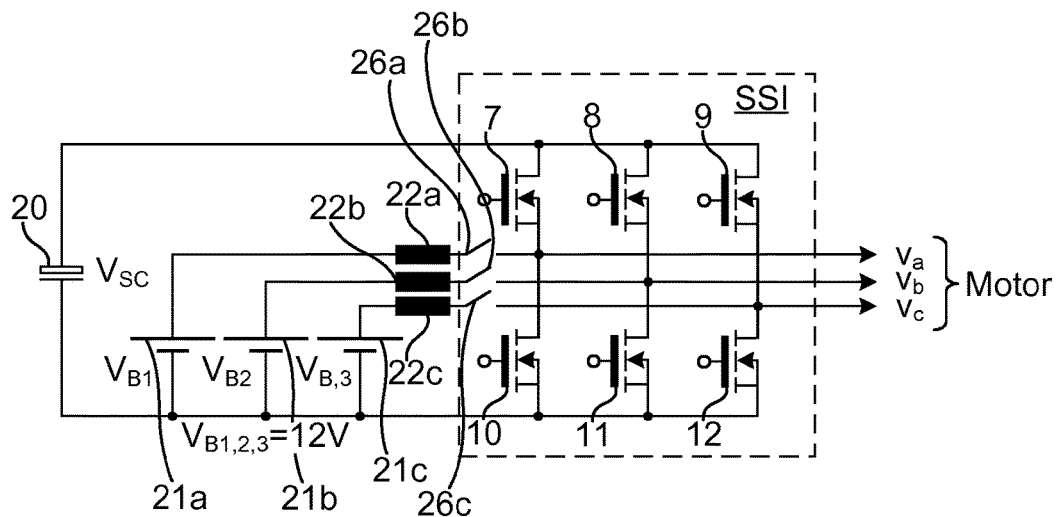

FIG. 4 illustrates an embodiment with a topology in which the battery 21 of FIG. 3 is divided into 3 modules, $V_{B1}$, $V_{B2}$, $V_{B3}$, wherein each module is connected between the negative DC-link pole and one of the AC terminals $V_a$, $V_b$, $V_c$, via switches $26_a$, $26_b$, $26_c$. Switches $26_a$, $26_b$, $26_c$ can be diodes, MOSFETs, or diodes with MOSFETs in series for full controllability. Switches $26_a$, $26_b$, $26_c$ may also be relays to enable only one of these batteries.

Figure 5:
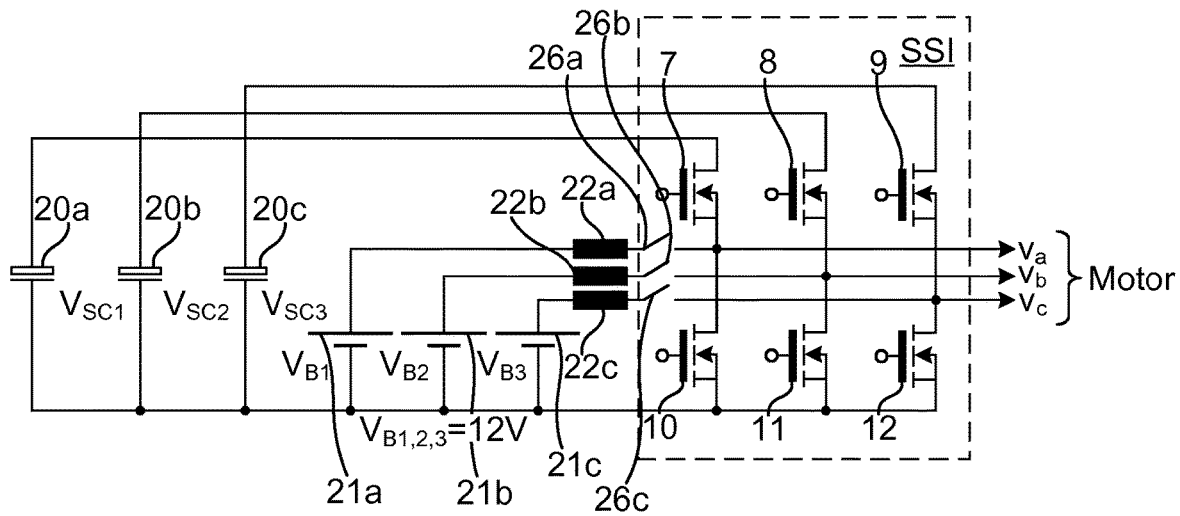

FIG. 5 illustrates an embodiment with a topology in which also the supercapacitor 20 is split into 3 modules $V_{SC1}$, $V_{SC2}$, $V_{SC3}$ in the same way as the battery illustrated in FIG. 4, so that each phase of the motor is connected to a half-bridge.

Figure 6:
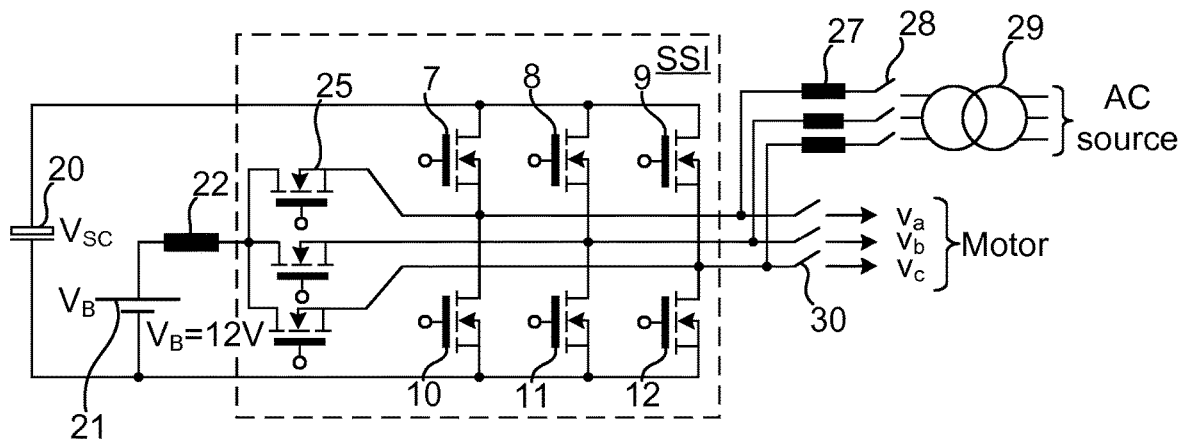

FIG. 6 illustrates an embodiment with an onboard charger for the topology of FIG. 3. An external AC-source is via a step-down transformer 29 connectable to the phases $V_a$, $V_b$, $V_c$ of the SSI via switches 28 and inductances 27. The motor is connectable via switches 30. The motor is disconnected when the battery 21 is charged via the external AC-source. The onboard charger is illustrated as connected to the three-phase terminals but can alternatively be connected to the common middle point pole as a single-phase charger instead. A relay or contactor can be used to avoid direct connection between the transformer and the motor. The switched may be MOSFETs as one alternative option, under which the onboard charger can be just a step-down transformer without much complexity, resulting in reduced system cost.

Selection of topology for a specific implementation may be dependent on the internal layout design of the AGV (i.e., space requirement) and required functionality.

An embodiment of an onboard powertrain for an AGV is presented with reference to FIGS. 4 and 5. The onboard powertrain comprises an SSI, a middle point pole per electrical phase of the SSI, a positive DC-link pole, and a negative DC-link pole, a battery 21 and an inductor 22 connected in series between the positive or negative DC-link pole and the middle point pole, and a supercapacitor 20 connected between the positive and negative DC-link poles.

The onboard powertrain may be configured to generate a plurality of electrical phases. There may be three electrical phases $V_a$, $V_b$, $V_c$.

Each electrical phase $V_a$, $V_b$, $V_c$ is connected to an individual middle point pole.

The onboard powertrain may further comprise a battery 21 and an inductor 22 connected in series between the positive or negative DC-link pole and each middle point pole.

The battery(ies) may be connected closer to the positive or negative DC-link pole than to the inductor.

The onboard powertrain may further comprise a supercapacitor per electrical phase $V_a$, $V_b$, $V_c$ of the SSI, each connected between a common negative DC-link pole for the SSI and a separate positive DC-link pole per phase of the SSI.

The onboard powertrain may further comprise an off-board charger with a step-down transformer.

The onboard charger may be connected to the electrical phases $V_a$, $V_b$, $V_c$ of the SSI via switches and inductances.

The onboard charger may be connected separately to individual middle point poles.

The capacitance of at least one supercapacitor 20 may be at least 1 mJ/mm3.

The capacitance of each supercapacitor 20 may be at least 1 farad (F), or may be at least 10 F, or may be at least 100 F.

An embodiment of an onboard powertrain for an AGV is presented with reference to FIGS. 2, 3 and 6. The onboard powertrain comprises an SSI having a common middle point pole, a positive DC-link pole, and a negative DC-link pole, a battery 21 and an inductor 22 connected in series between the positive or negative DC-link pole and the common middle point pole, and a supercapacitor 20 connected between the positive and negative DC-link poles.

The onboard powertrain may be configured to generate a plurality of electrical phases. There may be three electrical phases $V_a$, $V_b$, $V_c$.

All electrical phases are connected to the common middle point pole.

The onboard powertrain may further comprise a semiconductor element 23, 24, 25 between the common middle point pole and each electrical phase $V_a$, $V_b$, $V_c$.

The semiconductor element may be a diode 23, 24 or a MOSFET 25.

The battery 21 may be connected closer to the positive or negative DC-link pole than to the inductor 22.

The onboard powertrain may further comprise a supercapacitor 20 per electrical phase $V_a$, $V_b$, $V_c$ of the SSI, each connected between a common negative DC-link pole for the SSI and a separate positive DC-link pole per phase of the SSI.

The onboard powertrain may further comprise an off-board charger with a step-down transformer 29.

The onboard charger may be connected to the electrical phases $V_a$, $V_b$, $V_c$ of the SSI via switches 28 and inductances 27.

The onboard charger may be connected to a common middle point pole.

The capacitance of at least one supercapacitor 20 may be at least 1 mJ/mm3.

The capacitance of each supercapacitor 20 is at least 1 F, or may be at least 10 F, or may be at least 100 F.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. An onboard powertrain for an automated guided vehicle, AGV, the onboard powertrain comprising:
   a split-source inverter, SSI, having at least one middle point pole, a positive DC-link pole, and a negative DC-link pole;
   a battery and an inductor connected in series between the positive or negative DC-link pole and the middle point pole; and
   a supercapacitor per electrical phase ($V_s$, $V_b$, $V_c$) of the SSI, each connected between a common negative DC-link pole for the SSI and a separate positive DC-link pole per phase of the SSI.

2. The onboard powertrain according to claim 1, configured to generate a plurality of electrical phases ($V_a$, $V_b$, $V_c$), such as three electrical phases ($V_a$, $V_b$, $V_c$).

3. The onboard powertrain according to claim 2, wherein each electrical phase ($V_a$, $V_b$, $V_c$) is connected to an individual middle point pole.

4. The onboard powertrain according to claim 3, further comprising a battery and an inductor connected in series between the positive or negative DC-link pole and each middle point pole.

5. The onboard powertrain according to claim 2, wherein all electrical phases are connected to a common middle point pole.

6. The onboard powertrain according to claim 5, further comprising a semiconductor element between the common middle point pole and each electrical phase.

7. The onboard powertrain according to claim 6, wherein the semiconductor element is a diode or a MOSFET.

8. The onboard powertrain according to claim 2, wherein the battery is connected closer to the positive or negative DC-link pole than to the inductor.

9. The onboard powertrain according to claim 1, wherein the battery is connected closer to the positive or negative DC-link pole than to the inductor.

10. The onboard powertrain according to claim 1, further comprising an off-board charger with a step-down transformer.

11. The onboard powertrain according to claim 10, wherein the onboard charger is connected to the electrical phases ($V_a$, $V_b$, $V_c$) of the SSI via switches and inductances.

12. The onboard powertrain according to claim 10, wherein the onboard charger is connected separately to individual middle point poles.

13. The onboard powertrain according to claim 10, wherein the onboard charger is connected to a common middle point pole.

14. The onboard powertrain according to claim 1, wherein the capacitance of at least one supercapacitor is at least 1 mJ/mm$^3$.

15. The onboard powertrain according to claim 14, wherein the capacitance of each supercapacitor is at least 1 farad (F), such as at least 10 F or at least 100 F.

16. An onboard powertrain for an automated guided vehicle, AGV, the onboard powertrain comprising:
   a split-source inverter, SSI, having at least one middle point pole, a positive DC-link pole, and a negative DC-link pole;
   a battery and an inductor connected in series between the positive or negative DC-link pole and the middle point pole;
   a supercapacitor connected between the positive and negative DC-link poles; and
   an off-board charger with a step-down transformer.

17. The onboard powertrain according to claim 16, wherein the onboard charger is connected to the electrical phases ($V_a$, $V_b$, $V_c$) of the SSI via switches and inductances.

18. The onboard powertrain according to claim 16, wherein the onboard charger is connected separately to individual middle point poles.

19. The onboard powertrain according to claim 16, wherein the onboard charger is connected to a common middle point pole.

20. The onboard powertrain according to claim 16, configured to generate a plurality of electrical phases ($V_a$, $V_b$, $V_c$).

* * * * *